United States Patent
Wilburn et al.

(10) Patent No.: US 9,479,328 B1
(45) Date of Patent: Oct. 25, 2016

(54) SECURE KEY PROVISIONING

(71) Applicant: Amazon Technologies, Inc., Reno, NV (US)

(72) Inventors: Victor Thomas Wilburn, Fremont, CA (US); Andrew Jay Roths, Kenmore, WA (US); Patrik Schnell, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 332 days.

(21) Appl. No.: 13/915,454

(22) Filed: Jun. 11, 2013

(51) Int. Cl.
*H04L 9/08* (2006.01)

(52) U.S. Cl.
CPC .................................. *H04L 9/0816* (2013.01)

(58) Field of Classification Search
CPC ..... H04L 9/08; H04L 9/0816; H04L 9/0822; H04W 12/04
USPC ..................... 380/277–285, 44–45
See application file for complete search history.

(56) References Cited

U.S. PATENT DOCUMENTS

| | | | |
|---|---|---|---|
| 5,155,701 A * | 10/1992 | Komori et al. .......... 365/185.23 |
| 2012/0137137 A1* | 5/2012 | Brickell et al. ............... 713/182 |
| 2013/0080764 A1* | 3/2013 | Khosravi et al. ............. 713/150 |
| 2014/0068246 A1* | 3/2014 | Hartley et al. ................ 713/155 |
| 2014/0093074 A1* | 4/2014 | Gotze et al. .................... 380/45 |

* cited by examiner

*Primary Examiner* — Benjamin Lanier
(74) *Attorney, Agent, or Firm* — Lee & Hayes, PLLC

(57) ABSTRACT

Some examples include provisioning secret material onto an electronic device. For instance, an electronic device may be provided with a provisioning key that can be used for provisioning other secret material on the electronic device. The provisioning key may be encrypted at a secure location using an on-chip key that is also sent to a processor manufacturer. The encrypted provisioning key may subsequently be decrypted by an electronic device having a processor installed that includes the on-chip key. The provisioning key is saved to the device and may then be used for securely provisioning other secret material onto the electronic device, such as one or more keys, one or more digital certificates, or other digital rights management information. Accordingly, the provisioning key provides the device manufacture with the ability to securely install secret material to the electronic device using a key that is never shared outside of a secure environment.

22 Claims, 8 Drawing Sheets

SECURE KEY PROVISIONING

BACKGROUND

Digital content items, such as videos, music, electronic books, and the like, may be consumed on a variety of electronic devices. These electronic devices and/or the content items to be consumed on these devices may often include digital rights management (DRM) technology for protecting the rights of content owners. Such DRM technology encourages content owners to make the content items more readily available to content providers and ultimately to consumers.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
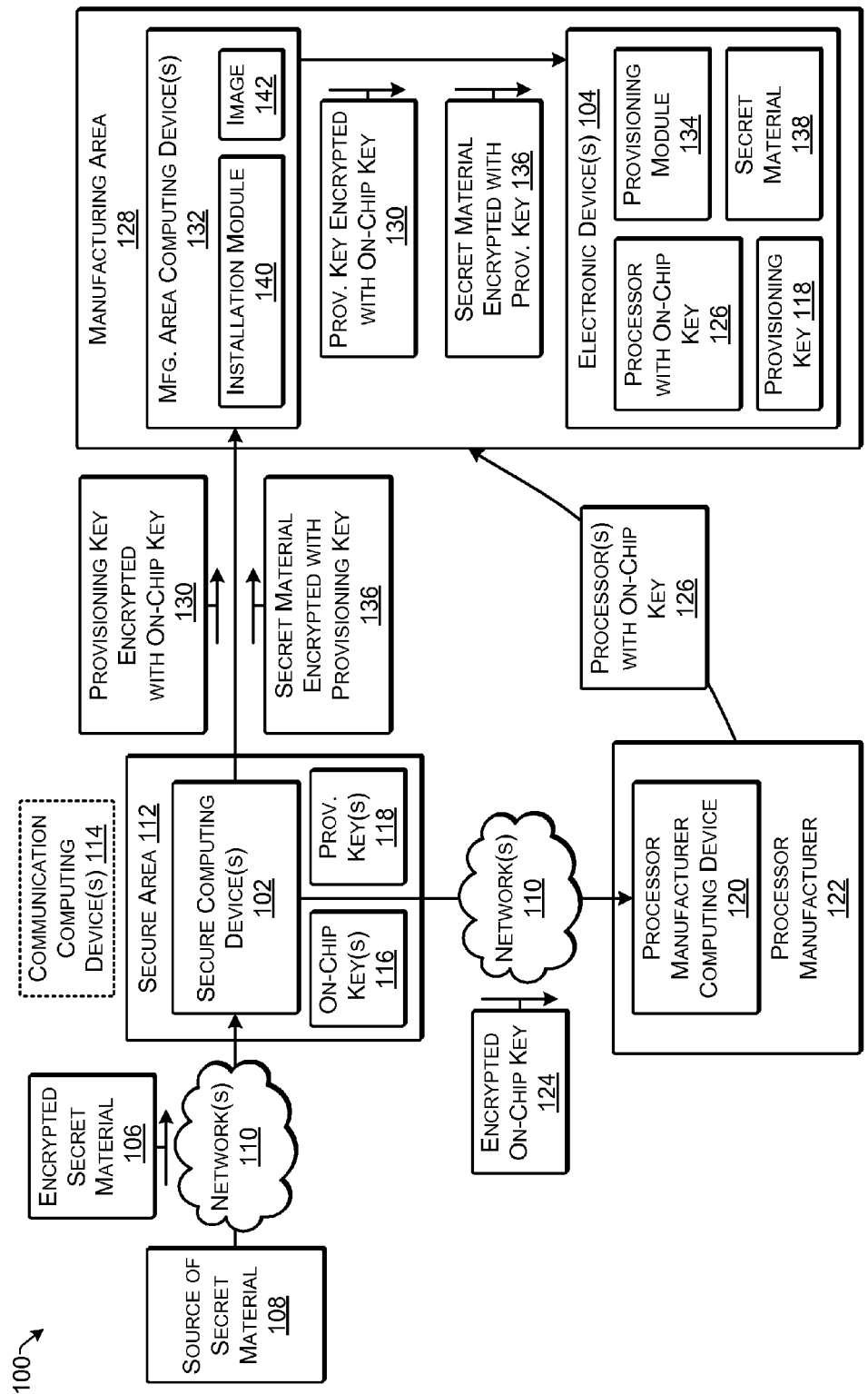
FIG. 1 illustrates an example system and framework for provisioning secret material on an electronic device according to some implementations.

This disclosure includes techniques and arrangements for provisioning secret material on an electronic device. In some examples herein, an electronic device is provided with a provisioning encryption key ("provisioning key") that can be used for provisioning other secret material on the electronic device. The provisioning key may be stored on the electronic device in a secure manner during manufacture of the electronic device, as discussed additionally below. The provisioning key may then be used by the device manufacturer for securely provisioning other secret material onto the electronic device, either during the manufacturing process or after the electronic device has been purchased by a consumer. Accordingly, the provisioning key provides the device manufacture with the ability to securely add secret material to the electronic device using a key that is never shared or exposed outside of a secure environment.

In some examples herein, secret material may be any information that the device manufacturer desires to install or otherwise place on an electronic device in a secure manner, such that the information is not exposed (e.g., in an unencrypted form) outside of a secure environment. As one example, digital rights management (DRM) technology may be employed with content items provided to an electronic device to protect the rights of the copyright owner and/or other parties. Some DRM technologies, such as PLAYREADY® DRM provided by Microsoft Corporation of Redmond, Wash., and High-bandwidth Digital Content Protection (HDCP), provided by Digital Content Protection LLC of Beaverton, Oreg., require that secret material, such as secret certificates and keys, or secret key sets, respectively, be stored on the electronic device to enable consumption of a content item that is protected by this DRM technology. As one example, such as in the case of PLAYREADY® DRM, when a content item is encrypted using this DRM technology, the electronic device uses the secret material to decrypt the content item during consumption. As another example, such as in the case of HDCP, the electronic device may use the secret material to encrypt content of a content item before sending the content to another device, such as a television. The secret material should be provided to the device in a secure fashion, stored securely on the device, and used securely on the device. For example, each HDCP-capable electronic device has a set of 40 56-bit keys stored on the electronic device that should remain secret to prevent possible unauthorized access to HDCP-protected content. The secret material may be provisioned on the electronic device at the time of device manufacture or in the field, such as after the electronic device has been sold to a consumer. However, conventional techniques of employing a secure server on a factory floor for installing secret material require a level of physical security in the factory that can be problematic to achieve on a consistent controllable basis.

In some examples herein, processors utilized in the electronic devices herein may include a small amount of one-time-programmable (OTP) memory that can be used to store a customer-specified key. A key stored in the processor typically can only be accessed in a secure execution environment implemented on the device, and can be programmed by the processor's manufacturer prior to shipment of the processors to the device manufacturer. However, this still requires a secure process to communicate the key to the processor manufacturer and program the key provided by the device manufacturer onto the processor. By taking advantage of this feature, the processor is provided to the device manufacturer already equipped with an on-chip key that could be used to encrypt/decrypt secret material for use on the electronic device. However, in the process of placing the on-chip key onto the processor, the on-chip key is exposed to the processor manufacturer, and thus is not always under the direct control of the device manufacturer. It is therefore desirable to limit usage of the on-chip key to limit the chance of exposing secret material if the on-chip key is compromised. Further, if the on-chip key is compromised, there is no means to replace or reprogram the on-chip key in the field.

Some implementations herein employ a provisioning key that can be used on the electronic device for provisioning the secret material on an electronic device instead of, for example, an on-chip key. The provisioning key itself can be encrypted with the on-chip key and sent in encrypted form to a factory or manufacturing area of the device manufacturer in encrypted form. Since the provisioning key is encrypted, the provisioning key does not require highly-secure handling. For example, the provisioning key can be placed on the electronic device as part of the manufacturing process, which already involves pushing data onto the electronic device. Also as a part of the manufacturing flow, the device manufacturer can cause execution of a provisioning module on the electronic device that uses the on-chip key to decrypt the provisioning key within a secure execution environment on the electronic device. The decrypted provisioning key can be stored in a secure storage on the device. For example, the provisioning module may re-encrypt the provisioning key with a device secret key, known only to the device itself as part of the secure storage capability of the device, and placed into memory in encrypted form. As discussed below, the device secret key is secret information, such as a random number, that is generated internally by the electronic device and is never shared or exposed outside of the electronic device. Accordingly, the electronic device may use the device secret key for encrypting information stored on the electronic device so that the information is securely stored on the electronic device.

After the provisioning key has been stored on the electronic device, the on-chip key is no longer needed except in the highly unlikely event of a breach of the provisioning key. With the provisioning key in place on the electronic device, the device manufacturer has a secure way to address secret data to the electronic devices using the provisioning key which, unlike the on-chip key, is never shared outside of the company, and the handling process for which is completely under control of the device manufacturer at all times. Even within the device manufacturer, access to the provisioning key may be extremely limited. For example, the provisioning key may be stored on a storage device or computer located in a safe with limited access, and the safe itself may be located in a room or other secure area with limited access, such as with access limited to a small number of authorized employees.

Therefore, the provisioning key can be used to encrypt the secret material that the device manufacturer desires to load onto the electronic device to implement the DRM or other content protection standards supported by the device manufacturer. For example, the device manufacture can use the provisioning key to encrypt the secret material within the secure, limited-access area mentioned above. The device manufacturer can then send the encrypted secret material to a factory or manufacturing area in that encrypted form without having to resort to highly secure handling measures. The encrypted secret material can be placed on the electronic devices during the manufacturing process while still encrypted. The provisioning module on each electronic device may use the provisioning key stored on the electronic device to decrypt the secret material within the secure execution environment on the electronic device, and store the secret material in the device's secure storage. In this way, the secret material is never exposed in the clear outside of the device manufacturer's secure area.

In addition, because the provisioning key is stored in device memory, the device manufacturer is able to replace the provisioning key in the field if the device manufacturer has reason to believe that the provisioning key has been breached. For example, the device manufacturer may encrypt a new provisioning key using the on-chip key in the secure room that has access only to authorized employees of the device manufacturer. The encrypted new provisioning key may then be pushed to electronic devices in the field, i.e., devices previously purchased by consumers, such as through a wired and/or wireless network. The provisioning module may then be executed on the electronic devices to place the new provisioning key into secure storage on the electronic devices to replace the original provisioning key.

The device manufacturer is able to define as many provisioning keys as desired and may assign the provisioning keys to particular devices, batches of devices, device models, types of devices, or other groupings or sets of devices. For example, a larger number of provisioning keys can limit the impact of the breach of any single provisioning key, but can also increase operational and logistical complexity. In addition, some secret material can be unique per-device, while other secret material can be the same across all devices of a particular model, batch, type, etc. The provisioning key herein can be used to encrypt the secret material in either case. As an example, some versions of HDCP key sets may be unique for each device, while PLAYREADY® model keys and certificates can be the same across all devices of a particular model.

In addition, other security measures may be layered on top of the provisioning key encryption. For instance, for per-device HDCP keys, the device manufacturer may encrypt each individual HDCP key set with the provisioning key, bundle together large numbers of such encrypted key sets, and encrypt the bundle using Pretty Good Privacy (PGP) (e.g., OpenPGP), or other encryption techniques, before sending the bundle of HDCP key sets to a factory or manufacturing area computer. The manufacturing area computer may apply PGP decryption to extract the encrypted key sets, leaving the provisioning key encryption in place. For example, this technique may satisfy contractual language calling for PGP-level encryption when communicating HDCP keys to remote locations.

The provisioning key may also be used to provision additional or replacement secret material to electronic devices in the field, i.e., devices already in possession of consumers. As one example, the provisioning key may be used to update the software on the electronic device to support an additional DRM scheme. The new secret material can be encrypted with the provisioning key and pushed to the electronic devices, such as over a network. The pushed information may trigger the provisioning module on the electronic devices to decrypt the secret material in each device's secure execution environment and install or store the secret material securely in the device's storage.

For discussion purposes, some example implementations are described in the environment of a device manufacturer installing secret material onto electronic devices. However, the implementations are not limited to the particular examples provided, and may be extended to other encryption environments, and other types of devices, as will be apparent to those of skill in the art having the benefit of the disclosure herein.

FIG. 1 illustrates an example framework 100 for provisioning secret material onto one or more electronic devices according to some implementations. Portions of the framework 100 may be executed by one or more secure computing devices 102, such as one or more secure computing devices 102 of a device manufacturer or any other entity that installs secret material onto one or more electronic devices 104. The secure computing device 102 may access, obtain, or otherwise receive the encrypted secret material 106. For example, the secure computing device 102 may receive the encrypted secret material 106 from a source of secret material 108 over one or more networks 110. For example, the source of secret material 108 may be any digital rights management company, representative, or other entity providing the secret material 106 to be placed on an electronic device 104.

The network(s) 110 may include a local area network (LAN), a wide area network (WAN), such as the Internet, or any combination thereof, and may include both wired and wireless communication technologies using any suitable protocols and communication techniques. The computing device 102 of the device manufacturer and the source 108 of the secret material 106 may communicate and interact with one another using any combination of suitable communication and networking protocols, such as Internet protocol (IP), transmission control protocol (TCP), hypertext transfer protocol (HTTP), and so forth.

Furthermore, in some examples, the secret material 106 is encrypted such as by using a public key of a public/private key pair or other suitable encryption technology. The secure computing device 102 may use a compatible technology to decrypt the encrypted secret material 106, such as by using a corresponding private key of the public/private key pair (not shown in FIG. 1). The secure computing device 102 may be maintained in a secure area 112 controlled by the device manufacturer. Examples of the secure area 112 may include a secure room, or other secure location, and may further include a safe, or various other security features and protocols to protect the secure computing device 102 and the other secure information maintained in the secure area 112 from unauthorized access or breach.

In some examples, direct communications into and out of the secure area 112 may be prohibited for added security, in which case one or more communication computing devices 114 controlled by the device manufacturer may be employed for carrying out the communications attributed herein to the secure computing device 102. For instance, the encrypted secret material 106 may be received by the communication computing device 114 outside of the secure area 112, stored on a removable storage media (not shown in FIG. 1), taken into the secure area 112 on the removable storage media, and then loaded onto the secure computing device 102. In other examples, however, the secure computing device 102 is able to communicate directly over the one or more networks 110 with suitable security protection, such as a firewall and the like.

The secure computing device 102 may be able to generate and/or access one or more on-chip keys 116 and one or more provisioning keys 118. The on-chip key 116 may be any secret information that is stored on or associated with a processor or other component of the electronic device 104 and used to encrypt and/or decrypt other information, such as to gain access to the other information. Further, the provisioning key 118 may be any secret information that is used to encrypt or decrypt other information, such as for provisioning information onto the electronic devices 104 in a secure manner. In some cases, both the on-chip key 116 and the provisioning key 118 are generated by the device manufacturer, and at least the provisioning key 118 is not exposed in an unencrypted form outside of a secure environment, such as the secure area 112 or a secure execution environment on the electronic device 104. For example, the secure computing device 102 may generate at least one on-chip key 116 and at least one provisioning key 118, such as by using a random number generator. The keys 116 and 118 may be of any suitable length, and may not be the same length. As several examples, the keys 116 and 118 may be 128 bits, 256 bits, and so forth.

The secure computing device 102 (or the communication computing device 114) may send at least one on-chip key 116 to a processor manufacturer computing device 120 of a processor manufacturer 122. For example, the secure computing device 102 may first encrypt the on-chip key 116, such as using a public key of a public/private key pair, to produce an encrypted on chip key 124. The secure computing device 102 may then send the encrypted on-chip key 124 over one or more networks 110 to the processor manufacturer computing device 120. The processor manufacturer 122 may then decrypt the encrypted on-chip key 124 using its own private key of the public/private key pair and incorporate the on-chip key 116 into one or more processors. As an alternative, the processor manufacturer 122 may generate the on-chip key 116, such as by using its own random number generator (not shown in FIG. 1). The processor manufacturer 122 may then provide the on-chip key 116 to the secure computing device 102 of the device manufacturer, such as by sending the on-chip key in an encrypted form to the communication computing device 114.

As mentioned above, the processor manufacturer 122 may embed or store the on-chip key 116 in one time programmable nonvolatile memory (OTP NVM) designed into the processor(s) to be provided to the device manufacturer for incorporation into the electronic device(s) 104. Accordingly, one or more processors 126 having the on-chip key 116 maintained thereon may be provided to the device manufacturer, such as by being provided to a manufacturing area 128 controlled by the device manufacturer. For example, a batch of processors 126 having the same on-chip key saved in the OTP NVM may be provided to the manufacturing area 128, and the batch may be identified as corresponding to a particular on-chip key 116.

Furthermore, the secure computing device 102 may encrypt at least one provisioning key 118 with the on-chip key 116 that was sent to the processor manufacturer 122. As one example, the secure computing device 102 may use Advanced Encryption Standard (AES) encryption technology, or other suitable encryption technology, to encrypt the provisioning key 118 with the on-chip key 116. The secure computing device 102 (or the communication computing device 114) may send the provisioning key 130 encrypted with the on-chip key to a manufacturing area computing device 132 within or accessible from the manufacturing area 128. For example, the manufacturing area computing device 132 may be remote from the secure computing device 102 at least by not being located in the same room as the secure computing device 102. In some cases, the manufacturing area computing device 132 may be located in a different city, state, country, etc., from the secure computing device 102. Accordingly, the provisioning key 130 encrypted with the on-chip key may be provided over the one or more networks 110, through a direct connection, or by any other suitable technique or transmission means.

The manufacturing area computing device 132 may provide the provisioning key 130 encrypted with the on-chip key to one or more of the electronic devices 104 during the manufacturing process. For instance, the provisioning key 130 encrypted with the on-chip key may be burned onto, or otherwise installed onto computer-readable media on the electronic device 104. As one example, the provisioning key 130 encrypted with on-chip key may be included in an image that is installed on the computer readable media of the electronic device 104. For example, the image may include various software modules such as an operating system, one or more applications, one or more other types of computer programs, one or more device drivers, data, or the like. In some examples, a model identifier, batch identifier, or the like may accompany the encrypted provisioning key to enable the manufacturing area computing device 132 to determine the correct electronic device on which to install the encrypted provisioning key.

As part of the manufacturing and software installation process for the electronic device 104, the manufacturing area computing device 132 may cause the electronic device 104 to execute a provisioning module 134 on the electronic device 104. For example, the provisioning module 134 may be included in the image installed on the electronic device 104, and may be executed in a secure environment on the electronic device to decrypt the provisioning key encrypted with the on-chip key by using the on-chip key stored in the storage location of the processor 126 with on-chip key. As mentioned above, OTP NVM or other suitable technology may be used to associate the on-chip key with the processor 126. The provisioning module 134 may access the on-chip key 116 from the processor 126 and may use the on-chip key 116 to decrypt the provisioning key 130 that was encrypted with the on-chip key.

Further, the provisioning module 134 or another module on the electronic device 104 may store the provisioning key securely on the electronic device 104. For example, the electronic device 104 may include an encryption module and a device secret key (not shown in FIG. 1) that is known only to the electronic device 104, and which may be used for securely storing information in an encrypted form on the electronic device 104. Accordingly, the electronic device 104 may re-encrypt the provisioning key 118 using the device secret key and may store the encrypted provisioning key 118 on computer-readable media included in the electronic device 104. Following re-encryption of the provisioning key and storage on the electronic device using the device secret key, the original version of the provisioning key encrypted with the on-chip key 116 may be deleted, overwritten or otherwise removed from the electronic device.

In addition, the secure computing device 102 may use the provisioning key 118 to encrypt the secret material received from the source of secret material 108, such as using AES or other suitable encryption technology. Thus, following decryption using the private key of a public/private key pair, the secure computing device may use the provisioning key 118 to encrypt the secret material to obtain secret material 136 encrypted with the provisioning key. The secure computing device 102 (or the communication computing device 114) may then transfer the secret material 134 encrypted with the provisioning key to the manufacturing area computing device 132, such as over the one or more networks 110, over a direct connection, or the like. The manufacturing area computing device 132 sees the secret material 136 encrypted with the provisioning key and may install this on to the electronic device 104. In some examples, a model identifier, batch identifier, or the like may accompany the encrypted material to enable the manufacturing area computing device 132 to determine the correct electronic device on which to install the secret material 136. Similar to the technique described above for the encrypted provisioning key 130, the secret material 136 may be installed as part of a larger image installed onto computer readable media of the electronic device 104. Alternatively, of course, the secret material 136 encrypted with the provisioning key may be installed separately on to the computer readable media of electronic device 104.

In either event, the manufacturing area computing device 132 may cause the provisioning module 134 to execute on the electronic device 104 for decrypting the secret material 136 encrypted with the provisioning key. In particular, the provisioning module 134 may use the provisioning key 118 stored on the electronic device 104 to decrypt the encrypted secret material 136 within a secure environment to obtain secret material 138. For example, the secret material 138 may be subsequently re-encrypted for secure storage using the device secret key mentioned above, or other suitable secure storage techniques. Following re-encryption and storage of the secret material 136 on the electronic device using the device secret key, the original version of the secret material encrypted with the provisioning key may be deleted, overwritten or otherwise removed from on the electronic device.

The manufacturing area computing device 132 may include various software modules for accomplishing the functions discussed above such as an installation module 140 that may be executed for installing software and data on the electronic devices 104, such as including an image 142 to which the provisioning key 130 encrypted with the on-chip key and/or the secret material 136 encrypted with the provisioning key may be added. For instance, the image 142 may include any of an operating system, applications, device drivers, other computer programs, code, scripts or data. Alternatively, the provisioning key 130 encrypted with the on-chip key and/or the secret material 136 encrypted with the provisioning key may be installed on the electronic devices 104 separately from the image 142.

In some cases, an entire batch of electronic devices 104, an entire model run of electronic devices 104, or an entire type of electronic devices 104, may be provisioned with secret material 138 using the same provisioning key 118 and on-chip key 116. In other cases, a greater granularity of provisioning keys 118 and on-chip keys 116 may be used depending on the device manufacturer's tolerance for the logistics involved in tracking a larger number of provisioning keys 118 and/or on-chip keys 116. For instance, the device manufacturer may maintain user account records that associate the device ID numbers with user accounts of users who purchased particular devices, along with the provisioning key 118 and on-chip key 116 that correspond to each of those electronic devices 104.

Furthermore, in some examples, other security measures may be layered on top of the provisioning key encryption applied to the secret material 136. For instance, when the secret material 136 is per-device HDCP keys, the device manufacturer may encrypt each individual HDCP key set with the provisioning key 118, and bundle up large numbers of such encrypted key sets for sending to the manufacturing area computing device 132. The bundle of HDCP key sets, each already encrypted with the provisioning key, may be further encrypted using any suitable encryption technology such as Pretty Good Privacy (PGP) (e.g., OpenPGP) before sending the bundle of HDCP key sets to the manufacturing area computing device 132. Thus, the secret material 136 that is already encrypted using the provisioning key may be further encrypted using a public key of a public/private key pair and sent to the manufacturing area computing device 132. Upon receipt of the encrypted bundle of secret material, the manufacturing area computing device 132 may apply PGP decryption, i.e., using the private key of the public/private key pair, to partially decrypt the received bundle of secret material to extract the encrypted key sets, leaving the provisioning key encryption of each key set in place. For example, this technique may satisfy contractual language calling for PGP-level encryption when communicating HDCP keys to remote locations.

Figure 2:
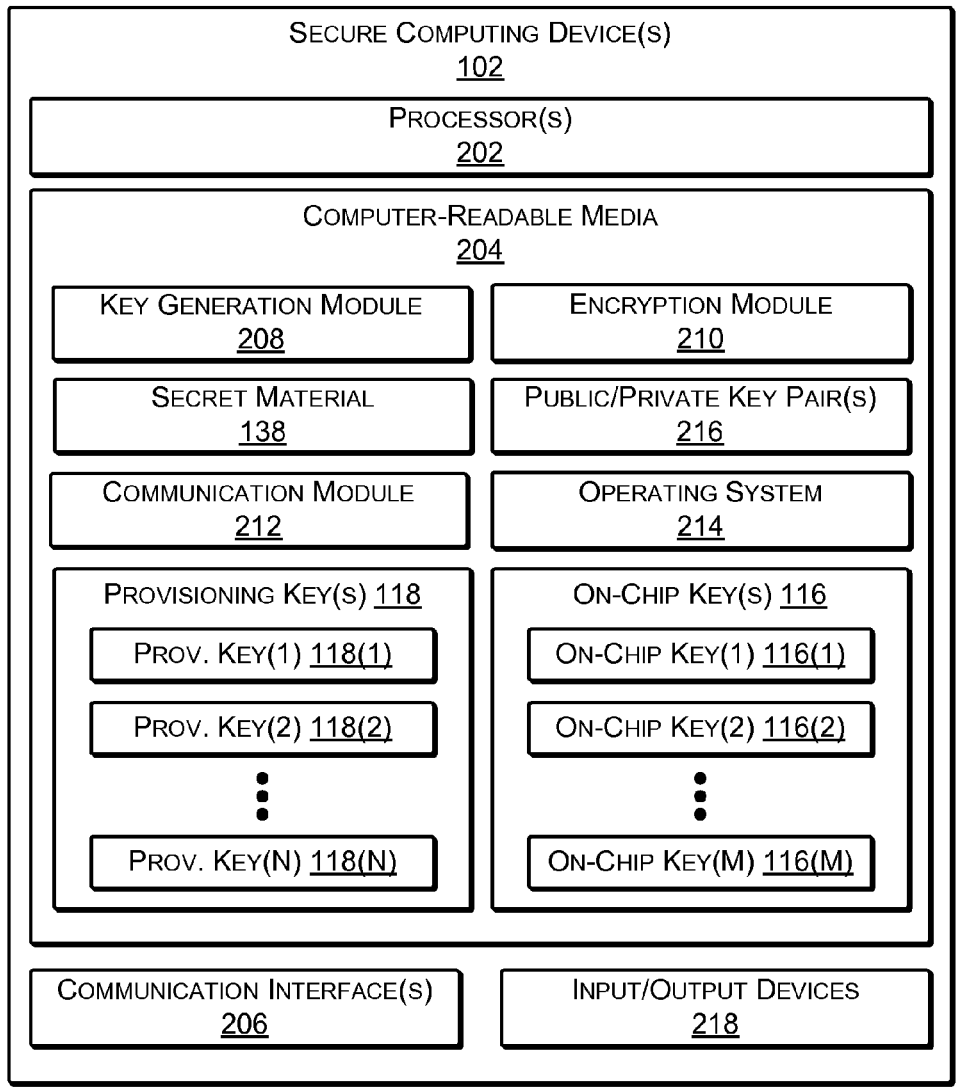
FIG. 2 illustrates select components of an example secure computing device according to some implementations.

FIG. 2 illustrates select components of one or more secure computing devices 102 that may be used to implement a portion of the functionality described herein according to some implementations. The secure computing device 102 may include one or more servers, desktops, laptops, or other types of computing devices that may be embodied in any number of ways. For instance, in the case of a server, the secure computing device 102 may be a single server or a cluster of servers stored in the secure area described above, although other computer architectures (e.g., a mainframe architecture) may also be used. Generally, the secure computing device 102 may be implemented by one or more computing devices within the secure area of the device manufacturer, with the various functionality distributed in various ways among the different computing devices.

As illustrated in FIG. 2, an example secure computing device 102 includes one or more processors 202, one or more computer-readable media 204, and one or more communication interfaces 206. The processor(s) 202 may be a single processing unit or a number of processing units, and may include single or multiple computing units or multiple cores. The processor(s) 202 can be configured to fetch and execute computer-readable instructions stored in the computer-readable media 204 or other computer-readable media.

The computer-readable media 204 may include volatile and nonvolatile memory and/or removable and non-removable media implemented in any type of technology for storage of information, such as computer-readable instructions, data structures, program modules or other data. Such computer-readable media 204 includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, removable storage media, or any other medium that can be used to store the desired information and that can be accessed by a computing device. Depending on the configuration of the computing device 102, the computer-readable media 204 may be a type of tangible computer storage media and may be a non-transitory storage media.

The computer-readable media 204 may be used to store any number of functional components that are executable by the processors 202. In many implementations, these functional components comprise instructions or programs that are executable by the processors 202 and that, when executed, implement operational logic for performing the actions attributed above to the computing device 102. Functional components of the computing device 102 that may be executed on the processors 202 for implementing the various functions and features related to encryption and communication, as described herein, include a key generation module 208, an encryption module 210 and a communication module 212. For example, the key generation module 208 may be a random number generator, or the like, for generating keys, such as the on-chip keys 116 and/or the provisioning keys 118. The encryption module 210 may use any suitable type of encryption technology, such as AES, for performing the various encryption operations discussed above. The communication module 212 may be used in the examples in which the secure computing device 102 is able to communicate directly outside of the secure area. Additional functional components stored in the computer-readable media 204 may include an operating system 214 for controlling and managing various functions of the computing device 102.

In addition, the computer-readable media 204 may include, or the computing device 102 may access, data, which may include the decrypted secret material 138, one or more public/private key pairs 216, one or more provisioning keys 118 such as provisioning key(1) 118(1), provisioning key(2) 118(2), ... provisioning key(N) 118(N), and one or more on-chip keys 116, such as on-chip key(1) 116(1), on-chip key(2) 116(2), ..., on-chip key 116(M). In addition, the secure computing device 102 may include many other logical, programmatic and physical components, of which those described above are merely examples that are related to the discussion herein.

The communication interface(s) 206 may include one or more interfaces and hardware components for enabling communication with various other devices over the network(s) 110. For example, communication interface(s) 206 may facilitate communication through one or more of the Internet, cable networks, cellular networks, wireless networks (e.g., Wi-Fi, cellular) and wired networks. Various different approaches to implementations described herein can be implemented in various environments. For instance, the network(s) 110 may include any appropriate network, including an intranet, the Internet, a cellular network, a LAN, WAN, VPN or any other network or combination thereof. Components used for such a system can depend at least in part on the type of network and/or environment selected. Protocols and components for communicating via such networks are well known and will not be discussed herein in detail. Further, as discussed above, in some examples, a communication module 212 and communication interfaces 206 may be alternatively included on a separate communication computing device 114 located outside of the secure area.

Secure computing device 102 may further be equipped with various input/output devices 218. Such I/O devices 218 may include a display, various user interface controls (e.g., buttons, mouse, keyboard, touch screen, etc.), audio speakers, connection ports and so forth.

In addition, the communication computing device 114, the processor manufacturer computing device 120, and the manufacturing area computing device 132 may include hardware components, such as a processor 202, computer readable media 204, and communication interface 206 similar to those discussed in FIG. 2, but with different functional components configured to accomplish the functions described above. For example, the manufacturing area computing device 132 may include the installation module 140 executable by a processor 202 for performing the installation functions discussed above.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Figure 3:
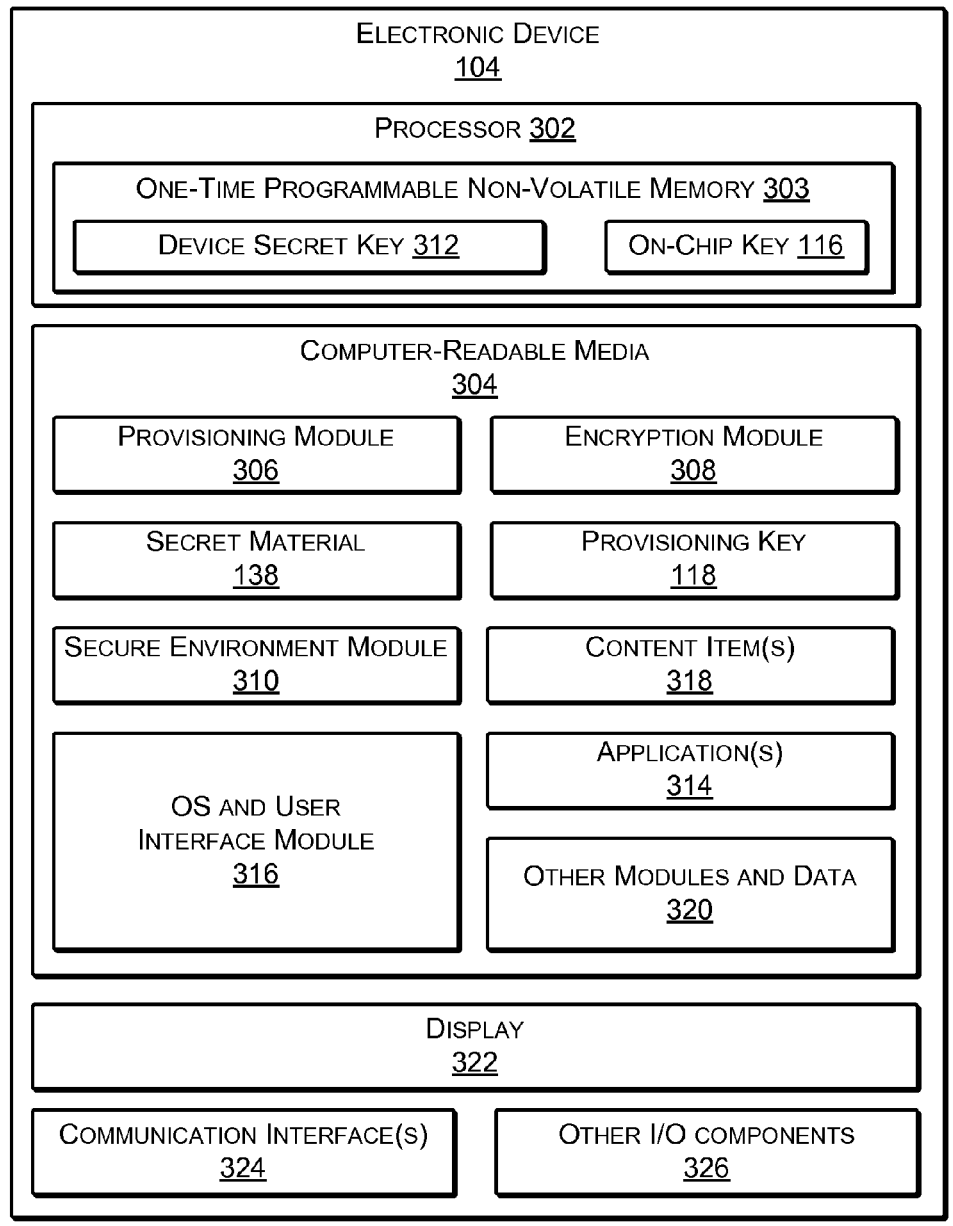
FIG. 3 illustrates select components of an example electronic device according to some implementations.

FIG. 3 illustrates select example components of the electronic device 104 that may be used to implement the functionality described above according to some implementations. Some examples of the electronic devices 104 may include media player devices and electronic book (eBook) readers; tablet computing devices; desktop, terminal and workstation computing devices; smart phones and mobile communication devices; laptop and netbook computing devices; televisions, gaming systems, augmented reality devices and wearable computing devices; home and automotive electronic devices; and any other device capable of accessing and rendering or displaying content items, online content, mobile content, web content, multimedia content, or the like.

In a very basic configuration, the electronic device 104 includes, or accesses, components such as at least one control logic circuit, central processing unit, or processor 302 and one or more computer-readable media 304. Each processor 302 may itself comprise one or more processors or processing cores. In some examples, the processor 302 may correspond to the processor 126 with on-chip key discussed above, and may include one-time programmable non-volatile memory (OTP NVM) 303 or other technology for enabling a particular on-chip key 116 to be associated with a particular processor 302.

Depending on the configuration of the electronic device 104, the computer-readable media 304 may be an example of tangible non-transitory computer storage media and may include volatile and nonvolatile memory and/or removable and non-removable media implemented in any type of technology for storage of information such as computer-readable instructions, data structures, program modules or other data. Such computer-readable media 304 may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processor 302 directly or through another computing device. Accordingly, the computer-readable media 304 may be computer-readable media able to store and maintain instructions, modules or components executable by the processor 302.

The computer-readable media 304 may be used to store any number of functional components that are executable by the processor 302. In some implementations, these functional components comprise instructions or programs that are executable by the processor 302 and that, when executed, implement operational logic for performing the actions attributed above to the electronic device 104. Functional components of the electronic device 104 stored in the computer-readable media 304 may include the provisioning module 306, executable by the processor 302 for decrypting the provisioning key 118 and/or the secret material 138. Additional functional components stored in the computer-readable media 304 may include an encryption module 308 and a secure environment module 310, which may be executed by the processor 302 for providing a secure execution environment on the electronic device 104 and for providing secure storage, such as by using a device secret key 312 to encrypt data for secure storage on the computer readable media 304. Thus, the presentation module 308 may present the interface 204 discussed above with respect to FIG. 2. Other functional components may include one or more applications 314 executable for various purposes, and an operating system and user interface module 316 for controlling and managing various functions of the electronic device 104.

The device secret key 312 may be an internal secret key that is securely generated and stored within the electronic device 104, such as in the OTP NVM 303 of the processor 302. In some examples, the device secret key 312 is secret information that is generated internally by the electronic device 104 and is never shared or known outside of the electronic device 104. Accordingly, the electronic device 104 may use the device secret key for encrypting and/or decrypting other information stored on the electronic device 104 so that the other information is securely stored on the electronic device. For instance, the device secret key 312 may be a random number or other secret information generated internally by the processor 302, such as during or after manufacture of the processor 302, and may be stored on the OTP NVM 303 of the processor 302 or other component of the electronic device 104. For example, the OTP NVM 303 may include eFuses or other suitable secure non-volatile memory that cannot be accessed through normal memory access techniques. Thus, the processor 302 may generate the device secret key 312, and the device secret key 312 is never known or exposed outside of the electronic device 104. As another example, the device secret key 312 and/or the on-chip key 116 may be maintained in a separate security chip (not shown in FIG. 3) that is separate from the main processor 302, such as is available from Renesas Electronics of Santa Clara, Calif., or other suitable vendors. Other variations for internal secure storage of secret material will also be apparent to those of skill in the art having the benefit of the disclosure herein.

The computer-readable media 304 may also store data, data structures, and the like, that are used by the functional components. For example, data stored by the computer-readable media 304 may include the provisioning key 118, the secret material 138, and one or more content items 318. For instance, the content items 318 may be protected by DRM and, thus, may require the secret material 138 to enable consumption of the content items 318 on the electronic device 104 or to enable sending content to another device for consumption. Further, one or more of the applications 314 may be used to consume the content items 318 in the secure execution environment with use of the secret material 138. Examples of content items 318 may include video content, audio content, images, multimedia items, electronic books and other textual content, web content, or any combination thereof.

Depending on the type of the electronic device 104, the computer-readable media 304 may also optionally include other functional components and other data 320. For instance, other modules may include device drivers and other programs, while other data may include, for example, data used by the operating system and user interface module 316 and the applications 314. Further, the electronic device 104 may include many other logical, programmatic and physical components, of which those described are merely examples that are related to the discussion herein.

FIG. 3 further illustrates a display 322, which may be passive, emissive or any other form of display. In one implementation, the display uses electronic paper (ePaper) display technology, which is bi-stable, meaning that it is capable of holding text or other rendered images even when very little or no power is supplied to the display. Some examples of suitable ePaper displays that may be used with the implementations described herein include bi-stable LCDs, MEMS, cholesteric, pigmented electrophoretic, and others. In other implementations, or for other types of devices, the display 322 may be an active display such as a liquid crystal display, plasma display, light emitting diode display, organic light emitting diode display, and so forth. These displays may comprise drive electronics, such as a display drive matrix configured to affect individual pixels within the display 322. In some examples, the display 322 may have a touch sensor associated therewith to provide touch input capability to the display 322.

One or more communication interfaces 324 may support both wired and wireless connection to various networks, such as cellular networks, radio, WiFi networks, short-range or near-field networks (e.g., BLUETOOTH®), infrared signals, local area networks, wide area networks, the Internet, and so forth. For example, the communication interface 324 may allow a user of the electronic device 104 to access the World Wide Web, download content items 318 from content provider sites, access online content, such as from a website or other network location, and the like. The communication interface 314 may further allow a user to access storage on another device, such as a user computing device, a network attached storage device, cloud storage, or the like.

The electronic device 104 may further be equipped with various other input/output (I/O) components 326. Such I/O components may include a touchscreen and various user controls (e.g., buttons, a joystick, a keyboard, a mouse, etc.), speakers, a microphone, a camera, connection ports, and so forth. For example, the operating system 316 of the electronic device 104 may include suitable drivers configured to accept input from a keypad, keyboard, or other user controls and devices included as the I/O components 326. For instance, the user controls may include page turning buttons, navigational keys, a power on/off button, selection keys, and so on. Additionally, the electronic device 104 may include various other components that are not shown, examples of which include removable storage, a power source, such as a battery and power control unit, a global positioning system (GPS) device, a PC Card component, and so forth.

Figure 4A:
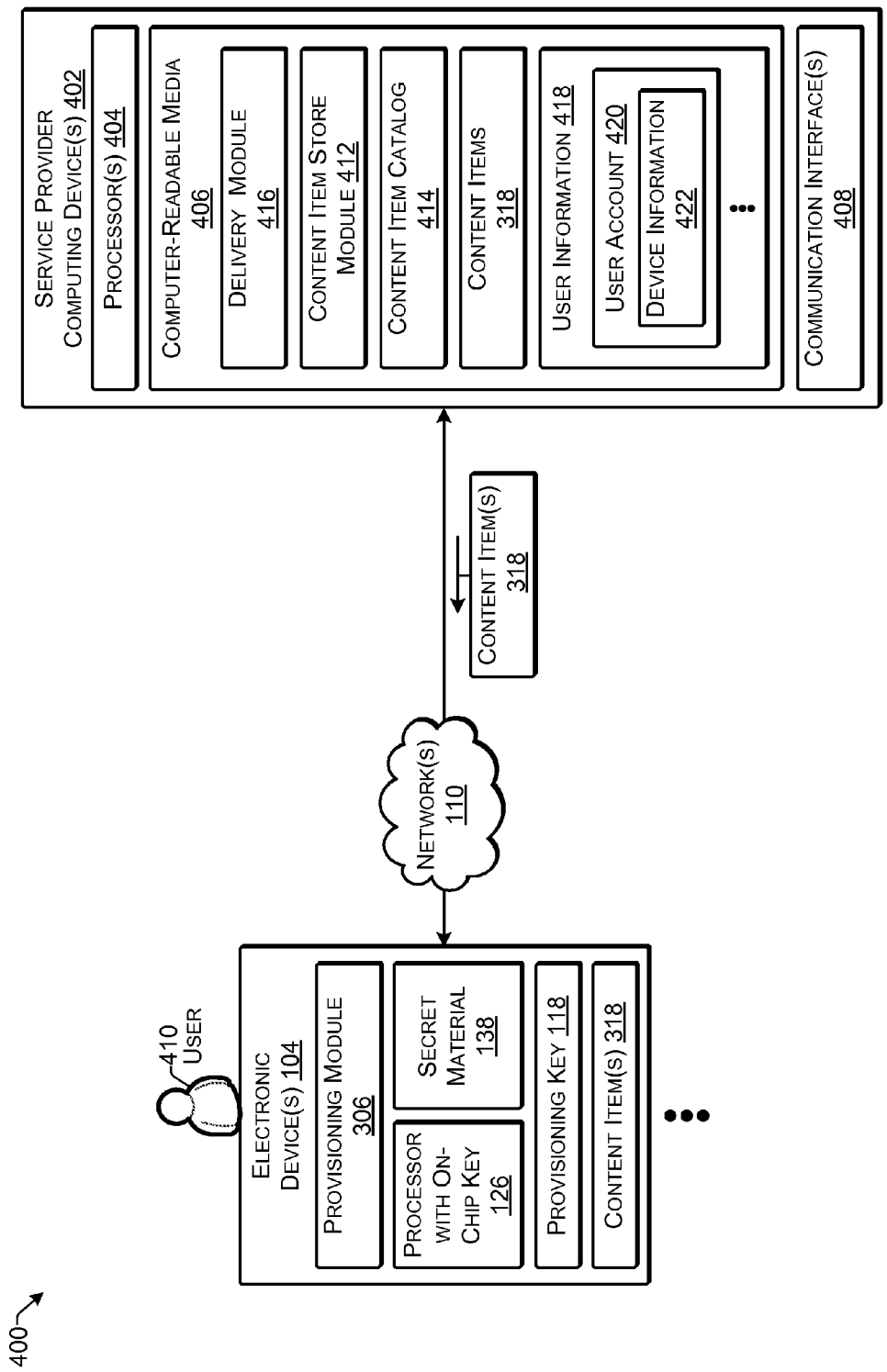
FIG. 4A illustrates an example architecture of a system able to provide content items to an electronic device according to some implementations.

FIG. 4A illustrates an example architecture of a system 400 able to provide content items to one or more electronic devices 104 according to some implementations. In the illustrated example, one or more electronic devices 104 can communicate with a service provider computing device 402. For instance, each electronic device 104 may communicate with one or more service provider computing devices 402, such as to access or receive content items 318 over the one or more networks 110. In some cases, the electronic device 104 may download one or more content items 318 from the content provider 402, stream one or more content items 318, or the like.

The service provider computing device 402 may maintain an online location or site, such as a merchant website, an e-commerce site, or other functionality that may offer one or more content items 318 to the public. In some cases, the service provider computing device 402 may offer the electronic devices 104 for sale as well. For example, the service provider computing device 402 may be one or more web servers located at a data center, server farm, or other single physical location. In other cases, the service provider computing devices 402 may include multiple computers located in diverse locations that are physically remote from one another. Further, in some implementations, the service provider computing devices 402 may provide a group of websites, data stores, services, and the like, hosted on a plurality of different computing devices 402 in a plurality of diverse locations, or hosted by one or more computing devices 102 at a single location. Each service provider computing device 402 may include one or more processors 404, which may be the same or similar to the processors 202 described above, one or more computer readable media 406, which may be the same or similar to the computer readable media 204 described above, and one or more communication interfaces 408, which may be the same or similar to the communication interfaces 206 described above.

The service provider computing device 402 may offer content items 318 to the public through an online presence accessible by a web browser or other application on the electronic device 104. The service provider computing device 402 alternatively, or additionally, may offer content items 318 through an online or mobile application executing on the electronic device 104. For example, an application on the electronic device 104 (not shown in FIG. 4A) may connect to or obtain information from the service provider computing device 402, to enable a user 410 of an electronic device 104 to select, purchase or manage one or more content items 318.

In the example of FIG. 4A, one or more users 410 may use one or more respective electronic devices 104 to access one or more content items 318 on the electronic devices 104. For example, each user 410 may use at least one device 104 to access at least one content item 318. In some cases the content items 318 may have DRM associated with them and may require appropriate secret material 138 to be present on the electronic device 104 to allow consumption of the associated content item 318. The user 410 may access or receive content items 318 from the service provider computing device 402, such as by downloading or streaming through the network 110.

The service provider computing device 402 may include a content item store module 412 that may provide or may access a content item catalog 414. For example, the content item store module 412 may present the content item catalog 414 to an electronic device 104 that accesses the service provider computing device 402 such as during shopping for a content item 318. The content item catalog 414 may include searchable and/or browsable listings and descriptions of content items 318 available from the service provider computing device 402, such as may be presented in the interface 300 discussed above.

The service provider computing device 402 may further include a delivery module 416 that may deliver (or make available for delivery) a content item 318 to the electronic device 104 and/or the user 410. For example, in some instances, the delivery module 416 may facilitate the download of a content item 318 to the electronic device 104 over the network(s) 110 following a purchase of access to the content item 318. In other instances, the delivery module 416 may provide for delivery of a hard copy of a content item 318 to the user 410, such as by delivery of a storage medium that maintains a copy of the content item, or a printed version of the content item 318, depending on the nature of the content item and the electronic device 104. The delivery module 416 may also expose programmatic interfaces or APIs (application programming interfaces) that electronic devices 104 can use to obtain content items 318 and other services.

Furthermore, in some implementations, the service provider computing device 402 may maintain user information 418. For example, the user information 418 may include one or more user accounts 420, which may include user data, such as user contact information, a purchase history, a user content item library, records relating to content items purchased by the user 410, as well as records of other transactions of the user 410 with the service provider computing device 402. The user account 420 may also include device information 422 regarding various devices 104 associated with a particular user account 420, such as device ID number, model number, batch number, or other information that may be used to associate a provisioning key and/or on-chip key with a particular electronic device 104 associated with the user account 420.

Figure 4B:
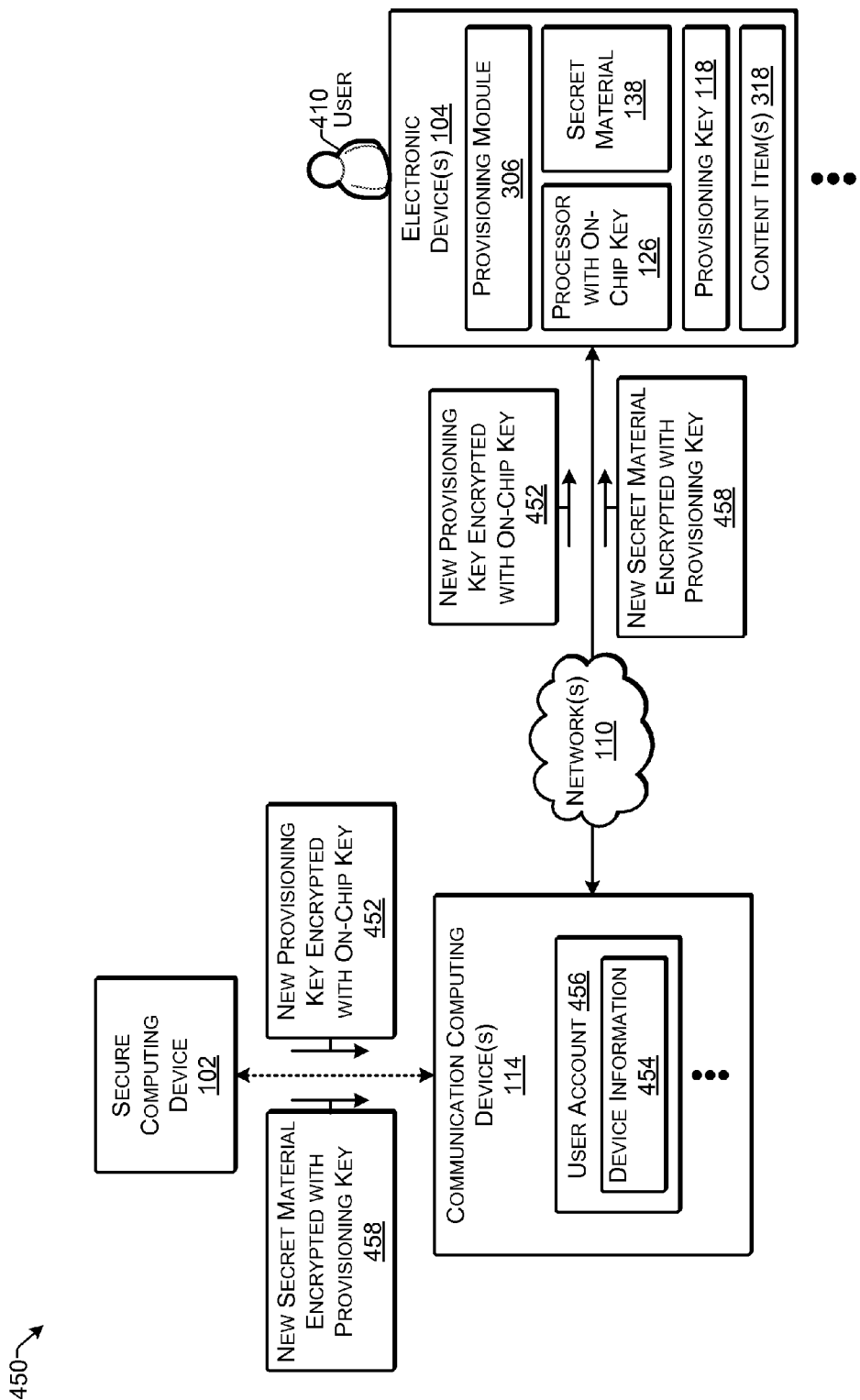
FIG. 4B illustrates an example architecture of a system able to update the provisioning key and/or secret material on an electronic device according to some implementations.

FIG. 4B illustrates an example architecture of a system 450 able to update the provisioning key and/or secret material on an electronic device according to some implementations. In this example, the communication computing device(s) 114 is in communication with the network(s) 110, and thereby able to communicate with the electronic devices 104 via the network(s) 110. In some examples, the secure computing device 102 may be able to communicate directly with the communication computing device 114 and/or may carry out the communication functions herein instead of the communication computing device 114. In other examples, the secure computing device 102 is isolated from some or all types of network communications, and thus, the communication computing device 114 is used for the communication functions discussed below.

As an example, suppose that the device manufacturer has determined that the provisioning key on the electronic device 104 has possibly been breached or otherwise compromised. Accordingly, the secure computing device 102 may be used to generate a new provisioning key 452 for the electronic device 104. The new provisioning key 452 may be encrypted using the on-chip key for the electronic device 104 and provided to the communication computing device 114. In some cases, the provisioning key 452 may sent to the communication computing device 114 via a communication link, while in other examples, the provisioning key 452 may be provided using removable storage media, or the like.

The communication computing device 114 may identify the electronic device 104 to which to deliver the new provisioning key 452. As one example, the communication computing device may identify the electronic device 104 based on device information 454 contained in user account information 456, which may be similar to the account information 420 and device information 422 discussed above with respect to FIG. 4A. Consequently, the communication computing device 114 may deliver the new provisioning key 452 to the electronic device 104. For example, the new provisioning key 452 may be delivered as part of an update to software on the electronic device 104, or may be delivered independently of any other updates.

Receipt of the new provisioning key 452 may cause the provisioning module 306 on the electronic device 104 to decrypt the new provisioning key using the on-chip key in a secure environment, and store the new provisioning key on the electronic device 104. For example, the new provisioning key 452 may be stored using secure storage techniques, as discussed above, and may subsequently be used in place of the old provisioning key 118. In some cases, the old provisioning key 118 may be deleted from the electronic device 104. Further, the version of the new provisioning key 452 encrypted with the on-chip key 452 is removed or overwritten on the electronic device following decryption and re-encryption of the new provisioning key with the device secret key 312 (not shown in FIG. 4B).

In addition, suppose that the device manufacturer would like to provide new secret material 458 to the electronic device 104. For example, a new DRM technology may have been introduced and the device manufacturer may like to upgrade previously sold electronic devices 104 to enable use of the new DRM technology. Accordingly, the secure computing device 102 may encrypt the new secret material 458 with the provisioning key for the appropriate corresponding electronic devices 104. The new secret material 458 encrypted with the provisioning key may be provided to the communication computing device 114. The communication computing device 114 may deliver the new secret material 458 to the electronic devices 104, e.g., as part of a periodic update or as part of a separate update.

Receipt of the new secret material 458 on the electronic device 104 may cause the provisioning module 306 on the electronic device 104 to decrypt the new secret material using the provisioning key stored on the electronic device in a secure environment, and install the new secret material in a secure location on the electronic device 104, such as using the device secret key 312 discussed above. The version of the secret material 458 encrypted with the provisioning key may then be deleted or overwritten on the electronic device 104. Furthermore, while several examples have been discussed herein, numerous variations will be apparent to those of skill in the art having the benefit of this disclosure.

Figure 5:
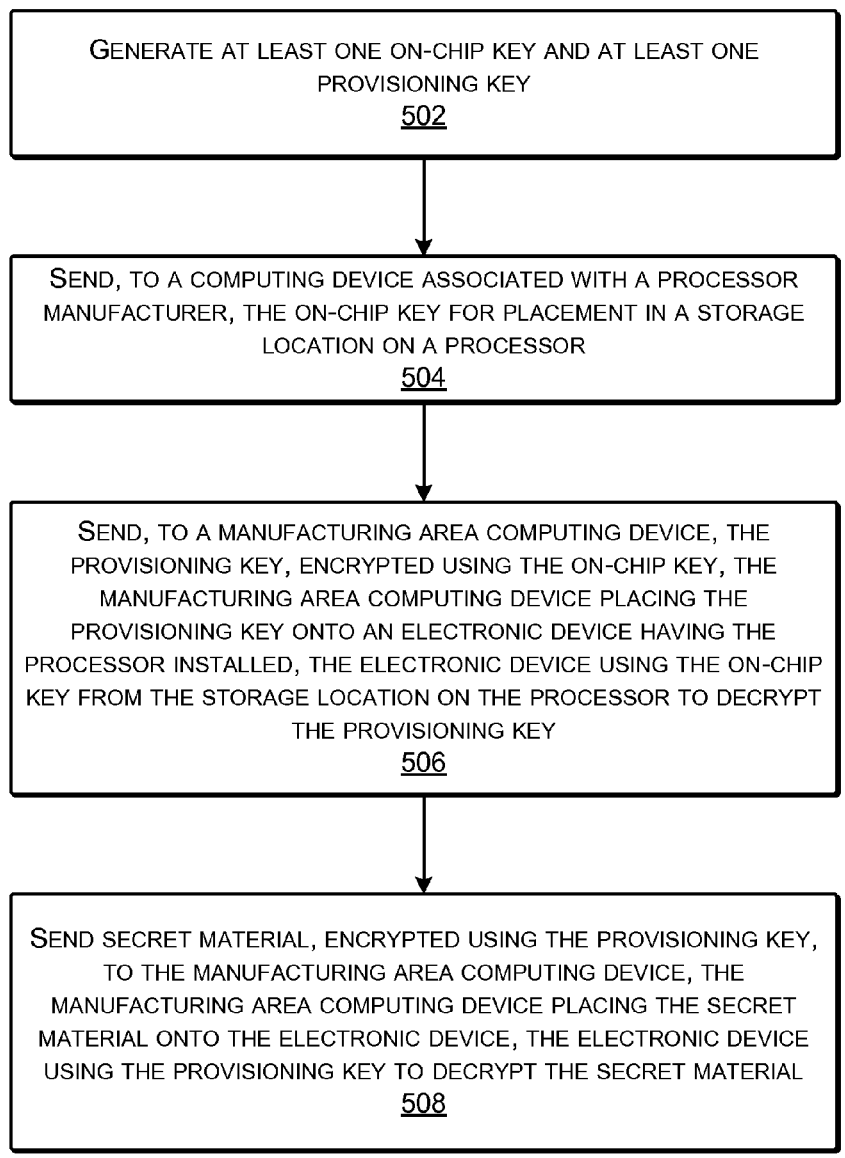
FIG. 5 is a flow diagram illustrating an example process for secret material provisioning executed by one or more computing devices of a device manufacturer according to some implementations.
Figure 6:
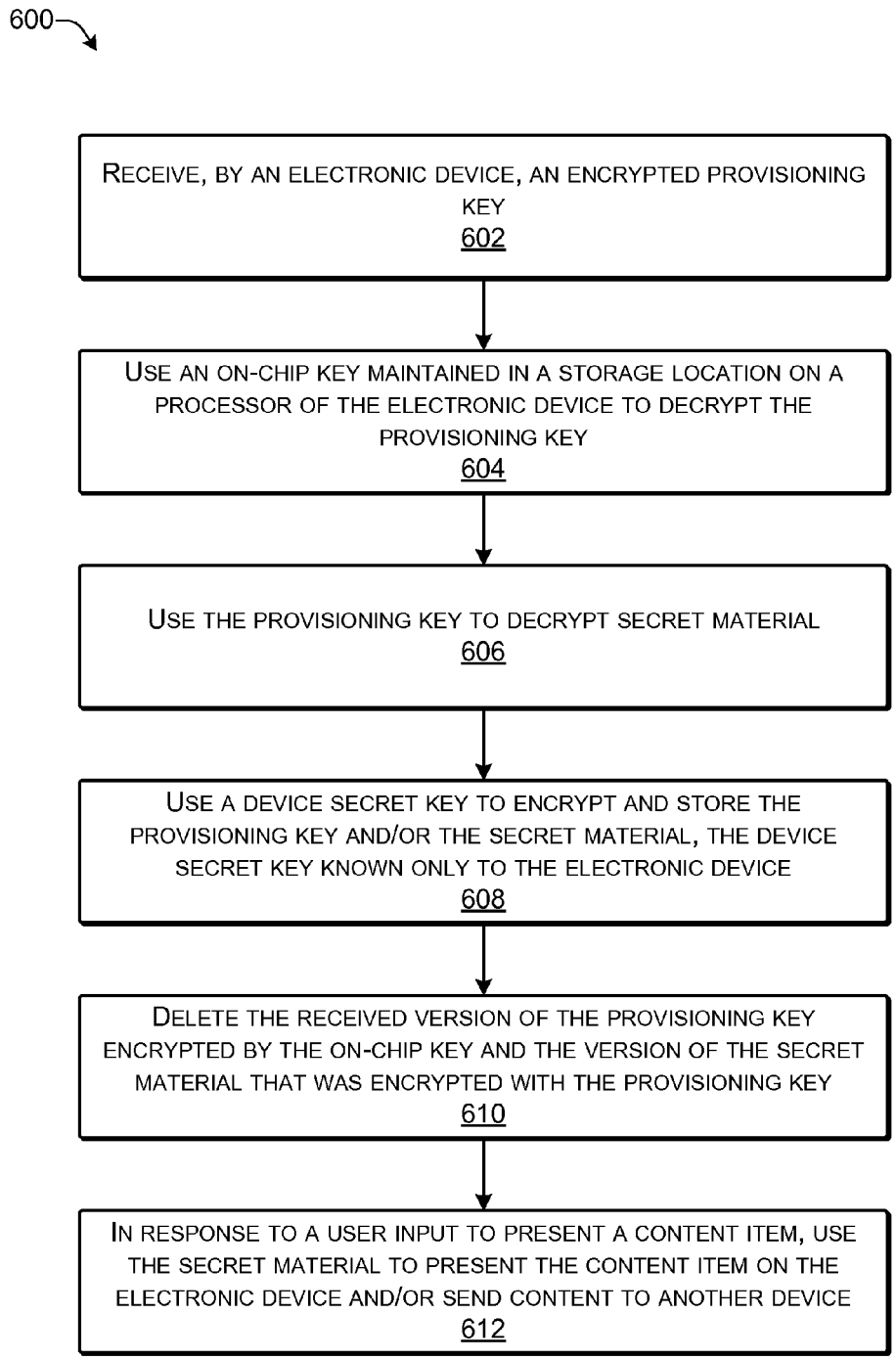
FIG. 6 is a flow diagram illustrating an example process for secret material provisioning executed by an electronic device according to some implementations.
Figure 7:
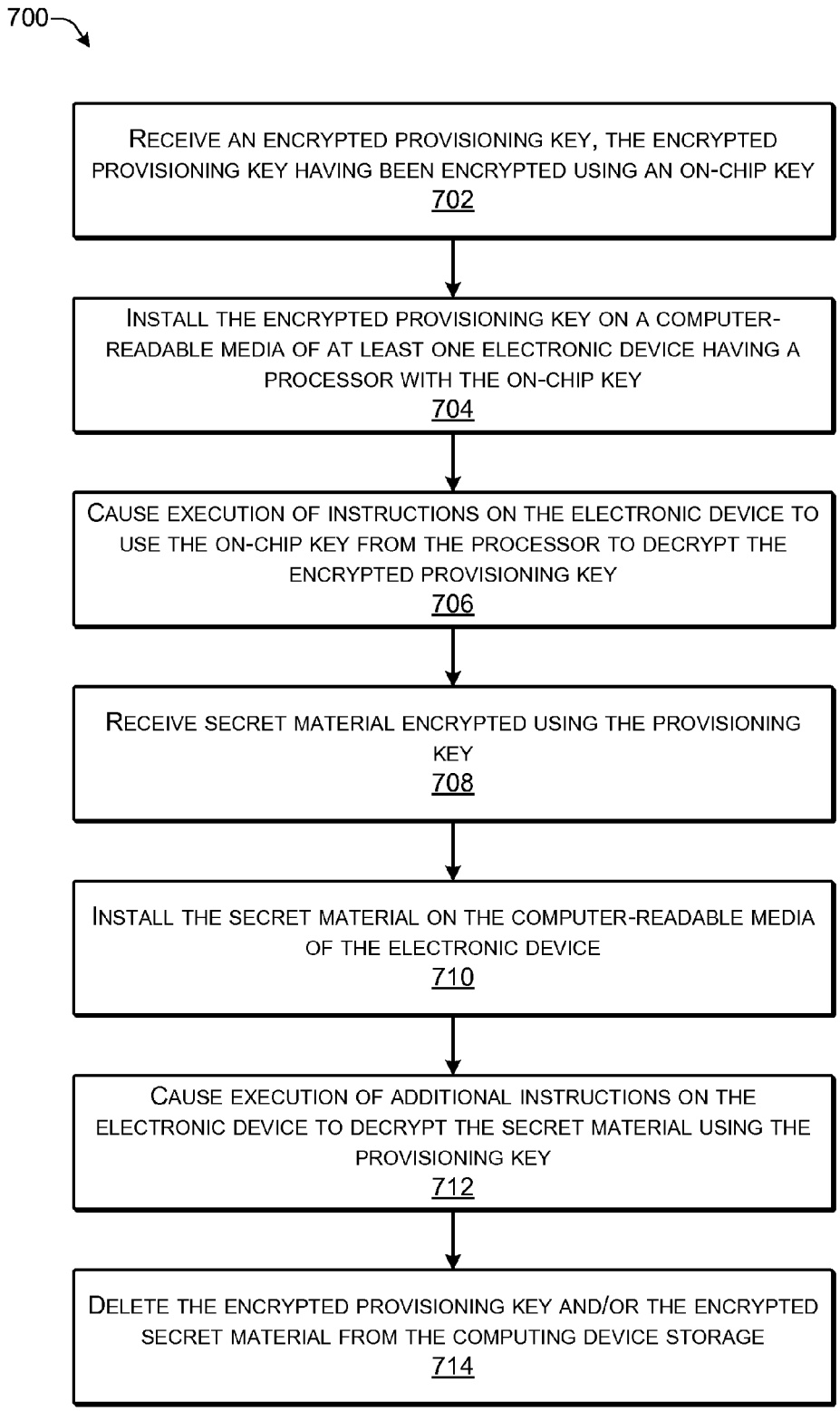
FIG. 7 is a flow diagram illustrating an example process for secret material provisioning executed by a manufacturing area computing device of a device manufacturer according to some implementations.

FIGS. 5-7 are flow diagrams illustrating example processes for provisioning secret material on one or more electronic devices according to some implementations. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 5 is a flow diagram illustrating an example process 500 according to some implementations. The process 500 may be performed by a computing device, such as one or more computing devices of a device manufacturer or other entity.

At 502, the one or more computing devices generate at least one on-chip key and at least one provisioning key. For example, the secure computing device in a secure area may use a random number generator to generate the keys.

At 504, the one or more computing devices send, to a computing device associated with a processor manufacturer, the on-chip key for placement in a storage location on a processor. For example, the one or more computing devices of the device manufacturer may send the on-chip key to a computing device of a processor manufacturer. The processor manufacturer may install the on-chip key on a batch of processors to be incorporated into electronic devices manufactured by the device manufacturer.

At 506, the one or more computing devices send, to a manufacturing area computing device, the provisioning key, which has been encrypted using the on-chip key. For example, the manufacturing area computing device may place the provisioning key onto an electronic device having the processor installed. For instance, the manufacturing area computing device may determine which model or batch of electronic device has the processor that corresponds to the on-chip key that was used to encrypt the provisioning key. The electronic device may use the on-chip key from the storage location of the processor to decrypt the provisioning key and store the provisioning key on the electronic device using a secure storage technology, such as by encrypting the provisioning key with the device secrete key.

At 508, the one or more computing devices send secret material encrypted using the provisioning key to the manufacturing area computing device. For example, the manufacturing area computing device may place the secret material onto the electronic device. The electronic device may use the provisioning key to decrypt the secret material and may store the secret material using a secure storage technology, such as by encrypting the secret material using the device secret key.

FIG. 6 is a flow diagram illustrating an example process 600 for provisioning secret material on an electronic device according to some implementations. For instance, the process 600 may be performed by an electronic device 104 according to the implementations herein.

At 602, the electronic device receives an encrypted provisioning key. For example, the electronic device may receive the encrypted provisioning key from a manufacturing area computing device, which in turn receives the encrypted provisioning key from a secure computing device that encrypted the provisioning key using an on-chip key.

At 604, the electronic device uses an on-chip key maintained in a storage location on a processor of the electronic device to decrypt the provisioning key. For example, the on-chip key may be stored in one time programmable non-volatile memory included with the processor. The provisioning key may be decrypted in a secure environment on the electronic device.

At 606, the electronic device uses the provisioning key to decrypt secret material. For example, the electronic device may have encrypted secret material already stored on the device, or may receive encrypted secret material from the manufacturing area computing device. The electronic device may use the provisioning key to decrypt the secret material.

At 608, the electronic device uses a device secret key to encrypt and store at least one of the provisioning key or the secret material for secure storage. For example, as described above, the device secret key may be known only to the electronic device, and may be used to securely encrypt and store information on the electronic device.

At 610, the electronic device deletes the received version of the provisioning key that was encrypted with the on-chip key and the secret material that was encrypted with the provisioning key. For example, as mentioned above, the provisioning key encrypted by the on-chip key may be stored initially on the electronic device without being encrypted using device secret key. Accordingly, following decryption of the provisioning key in the secure environment and re-encryption of the provisioning key using the device secret key, the initial version of the encrypted provisioning key stored on the device may be deleted, overwritten, or otherwise removed. Similarly, the version of the secret material encrypted with the provisioning key may be initially stored on the electronic device without using the device secret key. Accordingly, following decryption of the secret material using the provisioning key in the secure environment and re-encryption of the secret material using the device secret key, the version of the secret material that was encrypted with the provisioning key and stored on the electronic device without being encrypted using electronic device secret key may also be deleted, overwritten or otherwise removed.

At 612, in response to a user input to present a content item, the electronic device may use the secret material to present the content item on the electronic device and/or to send content to another device, such as for playback. For example, during presentation of a content item that is control by DRM, the electronic device may decrypt the secret material and use the secret material to decrypt the content item so that the content item maybe displayed or otherwise presented on the electronic device. Further, as another example, the electronic device may use the secret material to encrypt content prior to sending the content to another device, such as for playback on a television.

FIG. 7 is a flow diagram illustrating an example process 700 for provisioning secret material on an electronic device according to some implementations. The process 700 may be performed by a computing device, such as one or more manufacturing area computing devices of a device manufacturer or other entity.

At 702, the computing device receives an encrypted provisioning key, where the encrypted provisioning key has been encrypted using an on-chip key. For example, a manufacturing area computing device may receive the encrypted provisioning key and may further receive an identifier that indicates a model number or batch of electronic devices onto which the encrypted provisioning key should be installed. For example, a particular on-chip key may correspond to a particular batch of processors that are installed into a particular model or batch of electronic devices.

At 704, the computing device installs the encrypted provisioning key on a computer readable media of at least one electronic device having a processor with the on-chip key. For example, computing device may install the encrypted provisioning key along with a software and data image that is installed on the electronic device during the manufacturing process. As another example, the computing device may install the encrypted provisioning key separately from other software and data.

At 706, the computing device causes execution of instructions on the electronic device to use the on-chip key from the processor to decrypt the encrypted provisioning key. For example, the computing device may cause the electronic device to execute a provisioning module that decrypts the provisioning key using the on-chip key obtained from the processor of the device. The provisioning key may then be stored in a secure manner on the electronic device.

At 708, the computing device receives secret material encrypted using the provisioning key. For example, the secret material may have been encrypted using the provisioning key by the secure computing device and then transmitted to the manufacturing area computing device.

At 710, the computing device installs the encrypted secret material on the computer readable media of the electronic device. For example, the computing device may install the encrypted secret material as part of a software and data image that is installed on to the electronic device during the manufacturing process. Alternatively, the computing device may install the encrypted secret material separately from other software or data.

At 712, the computing device causes execution of additional instructions on the electronic device to decrypt the secret material using the provisioning key. For example, the computing device may cause execution of the provisioning module on the electronic device, which causes the provisioning module to use the provisioning key to decrypt the secret material. The decrypted secret material may then be stored in a secure manner on the electronic device.

At 714, the computing device deletes the encrypted provisioning key and/or the encrypted secret material from the computing device storage. For example, following completion of a model production run, a batch production run, etc., or following receipt of a new provisioning key and new secret material for use on a next batch of devices, or when reaching some other point at which the encrypted provisioning key and/or the encrypted secret material will no longer be used during the manufacturing process, the computing device may delete, overwrite or otherwise remove from the storage of the computing device the provisioning key encrypted with the on-chip key and the secret material encrypted with the provisioning key.

Additionally, the example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
    one or more first computing devices programmed by executable instructions to perform operations that include:
        sending, to a second computing device associated with a processor manufacturer, an on-chip key for placement in a one time programmable nonvolatile storage location on a processor;
        sending, to a third computing device, an encrypted provisioning key, encrypted using the on-chip key, wherein the third computing device places the encrypted provisioning key onto an electronic device having the processor installed, and wherein the electronic device uses the on-chip key from the one time programmable nonvolatile storage location on the processor to decrypt the encrypted provisioning key to generate a provisioning key; and
        sending encrypted secret material, encrypted using the provisioning key, to the third computing device, wherein the third computing device places the encrypted secret material onto the electronic device, wherein the electronic device is configured to:
            use the provisioning key to decrypt the encrypted secret material to generate secret material;
            generate a re-encrypted provisioning key by re-encrypting the provisioning key using a device secret key;
            refrain from transmitting the device secret key to other devices different than the electronic device;
            store the re-encrypted provisioning key on the electronic device;
            generate re-encrypted secret material by re-encrypting the secret material using the device secret key;
            delete the provisioning key from the electronic device; and
            delete the secret material from the electronic device.

2. The system as recited in claim 1, wherein encryption of the provisioning key using the on-chip key and encryption of the secret material using the provisioning key are performed in a secure area.

3. The system as recited in claim 1, wherein:
    the secret material is associated with a digital rights management system; and
    the secret material includes at least one of a secret encryption key or a secret digital certificate.

4. The system as recited in claim 1, the operations further comprising:
    prior to sending the secret material, receiving the secret material in an encrypted form; and
    decrypting the secret material in a secure area using a private key of a public/private key pair.

5. The system as recited in claim 1, wherein the third computer is in a first physical location that is remote from a second physical location of the one or more first computing devices.

6. A method comprising:
    receiving, by an electronic device, an encrypted first key;
    using, by the electronic device, a second key maintained in a one time programmable nonvolatile storage location on a processor of the electronic device to decrypt the encrypted first key to create a decrypted first key;
    generating, by the electronic device, decrypted secret material by using the decrypted first key to decrypt encrypted secret material;
    generating, by the electronic device, a re-encrypted first key by using a third key to re-encrypt the decrypted first key;
    refraining, by the electronic device, from transmitting the third key to other devices different than the electronic device;
    generating, by the electronic device, re-encrypted secret material by using the third key to re-encrypt the decrypted secret material;
    deleting the encrypted first key from the electronic device;
    deleting the encrypted secret material from the electronic device; and
    deleting the decrypted secret material from the electronic device.

7. The method as recited in claim 6, wherein the first key is a provisioning key, the second key is an on-chip key, and the third key is a device secret key.

8. The method as recited in claim 7, further comprising:
    determining that the provisioning key has been at least one of breached or compromised;
    based at least partly on determining that the provisioning key has been at least one of breached or compromised, receiving, by the electronic device, over a network, a new provisioning key encrypted using the on-chip key;
    using the on-chip key to decrypt the new provisioning key;
    storing the new provisioning key; and
    using the new provisioning key to decrypt additional secret material subsequently received by the electronic device.

9. The method as recited in claim 7, further comprising:
receiving, by the electronic device, over a network, encrypted new secret material; and
using the provisioning key to decrypt the encrypted new secret material.

10. The method as recited in claim 6, further comprising:
receiving, by the electronic device, a user input to cause presentation of a content item; and
using the secret material, at least in part, to present the content item on the electronic device.

11. The method as recited in claim 6, wherein:
the secret material is associated with a digital rights management system; and
the secret material includes at least one of a secret encryption key or a secret digital certificate.

12. The method as recited in claim 6, wherein the electronic device receives at least one of the first key or the secret material as part of an image installed on the electronic device, the image including at least one of an operating system, a computer program, or a device driver.

13. The method as recited in claim 6, wherein the first key is received based at least in part on at least one of:
a model of the electronic device;
a production batch of the electronic device; or
a device type of the electronic device.

14. A method comprising:
receiving, by a computing device, an encrypted first key that is generated by encrypting a first key;
receiving, by the computing device, encrypted secret material that is encrypted using the first key;
installing the encrypted first key on a computer-readable media of at least one electronic device having a processor, wherein a second key is stored on a one time programmable nonvolatile memory associated with the processor;
installing the encrypted secret material on the computer-readable media of the electronic device;
causing execution of instructions on the electronic device to:
use the second key to decrypt the encrypted first key to create a decrypted first key;
decrypt the encrypted secret material using the decrypted first key to generate decrypted secret material;
generate a re-encrypted first key by encrypting the decrypted first key with a third key;
generate re-encrypted secret material by encrypting the decrypted secret material with the third key;
refrain from transmitting the third key to other devices different than the electronic device; and
delete the encrypted first key, the decrypted first key, the encrypted secret material and the decrypted secret material from the electronic device.

15. The method as recited in claim 14, wherein the secret material that is partially decrypted corresponds to a plurality of key sets, each key set of the plurality of key sets intended for a different electronic device of a plurality of electronic devices.

16. The method as recited in claim 14, wherein the encrypted first key is received from a secure computing device located in a secure area remote from an area in which the computing device is located.

17. The method as recited in claim 16, wherein the encrypted first key is received from the secure computing device via a communication computing device located outside of the secure area.

18. The method as recited in claim 14, wherein the first key is a provisioning key and the second key is an on-chip key.

19. The method as recited in claim 14, wherein:
the secret material is associated with a digital rights management system; and
the secret material includes at least one of a secret encryption key or a secret digital certificate.

20. The method as recited in claim 19, further comprising:
receiving, by the computing device, input to cause presentation of a content item; and
using the secret material, at least in part, to present the content item on the computing device.

21. The method as recited in claim 14, wherein the computing device receives at least one of the encrypted first key or the encrypted secret material as part of an image installed on the computing device, the image including at least one of an operating system, a computer program, or a device driver.

22. The method as recited in claim 14, further comprising:
determining that the re-encrypted first key or a decrypted version of the re-encrypted first key has been at least one of breached or compromised;
based at least partly on determining that the re-encrypted first key or a decrypted version of the re-encrypted first key has been at least one of breached or compromised, receiving, by the electronic device, over a network, an encrypted revised first key;
using the second key to decrypt the encrypted revised first key and generate a revised first key;
encrypting the revised first key using the third key to generate a re-encrypted revised first key;
storing the re-encrypted revised first key; and
deleting the encrypted revised first key and the revised first key.

* * * * *